United States Patent [19]

Withers

[11] Patent Number: 5,524,709
[45] Date of Patent: Jun. 11, 1996

[54] METHOD FOR ACOUSTICALLY COUPLING SENSORS IN A WELLBORE

[75] Inventor: Robert J. Withers, Plano, Tex.

[73] Assignee: Atlantic Richfield Company, Los Angeles, Calif.

[21] Appl. No.: 435,015

[22] Filed: May 4, 1995

[51] Int. Cl.$^6$ .............................. B09B 1/00; E21B 47/12
[52] U.S. Cl. ........................ 166/250.1; 166/66; 166/292; 166/300; 405/128
[58] Field of Search ..................... 166/65.1, 66, 250.1, 166/292, 300; 405/128; 588/250, 260

[56] References Cited

U.S. PATENT DOCUMENTS

| | | | |
|---|---|---|---|
| 2,193,807 | 3/1940 | Dieterich | 166/292 |
| 2,772,739 | 12/1956 | Brakel et al. | 166/292 |
| 4,548,266 | 10/1985 | Burklund | 166/66 X |
| 4,775,009 | 10/1988 | Wittrisch et al. | 166/66 X |
| 5,181,565 | 1/1993 | Czernichow | 166/66 |
| 5,265,680 | 11/1993 | Withers et al. | 166/65.1 X |
| 5,405,224 | 4/1995 | Aubert et al. | 405/128 |

OTHER PUBLICATIONS

Brochure: "Magne Plus Cement", BJ Services Company, Tomball, TX, Jan. 1994.

Primary Examiner—George A. Suchfield
Attorney, Agent, or Firm—Drude Faulconer

[57] ABSTRACT

A method for releasably, acoustically-coupling an acoustical-energy sensor in a wellbore wherein the sensor is lowered in the wellbore and a soluble cement is flowed into the wellbore to completely encompass the sensor. The soluble cement is allowed to harden to physically bond and thereby acoustically couple the sensor to said wellbore. When it is desired to remove the sensors, a solvent is flowed down the wellbore and into contact with the hardened soluble cement to dissolve the soluble cement. The dissolved cement is then circulated out of the well and the sensors removed so that the well is again available for other operations.

8 Claims, 2 Drawing Sheets

METHOD FOR ACOUSTICALLY COUPLING SENSORS IN A WELLBORE

DESCRIPTION

1. Technical Field

The present invention relates to a method for acoustically coupling sensors in a wellbore and in one of its aspects relates to a system and method for acoustically coupling sensors within a wellbore wherein a dissolveable solid cement is used to releasably secure the sensors within a well tubing or annulus whereby the sensors are in good acoustical contact therewith during a sensing operation but can be removed from the well by dissolving the cement.

2. Background Art

In the production of hydrocarbons or the like from subterranean formations, it is common to "hydraulically fracture" a producing formation to increase its permeability, hence the productivity from the formation. In a typical hydraulic fracturing operation, a fracturing fluid (e.g. a liquid such as a gel) is injected under pressure into the formation through an injection well. This fluid may carry entrained, particulate material such as sand or gravel (commonly called "props") which is deposited in the fracture as the fracture is formed to prop or hold the fracture open after the fracturing pressure is relaxed.

In the last few years, hydraulic fracturing has become an important tool not only in the production of hydrocarbons but also in the disposing of unwanted waste materials into subterranean formations. That is, certain waste materials, e.g. drill cuttings or the like from well drilling operations, may be disposed by forming a slurry which can then be injected in certain earth formations; e.g. see U.S. Pat. Nos. 4,942,929 and 5,387,737. The waste slurry acts as the fracturing fluid in that it fractures the formation as it is injected and deposits the solid wastes similarly as props are deposited in a fractured formation.

One very important consideration in disposing of wastes in this manner, especially if the wastes include any hazardous material, is the ecological effect that the disposed material may have on the environment. That is, it is important that the wastes, once deposited in a formation, do not leach or migrate out of that formation into another formation, e.g. an aquifier, from which fluids, e.g. water, may be produced which could bring the waste back to the surface as a contaminant. Therefore, the formations which are to be used as disposal zones need to be carefully selected based on several important characteristics.

For a good discussion of the characteristics which are important or desirable in disposal formations, see U.S. Pat. No. 5,226,749. As disclosed therein, the formation should not only be capable of being hydraulically-fractured by the slurry of waste material to provide a permeable zone but should also be bounded by at least an upper and preferably a lower formation zone which have higher, in situ compressive stresses whereby substantially all of the hydraulic fracturing will be confined to the disposal zone.

Unfortunately, formations having all of these desired characteristics are not always available in the areas where the disposal is to take place. That is, a zone may be available which is capable of being fractured to hold large amounts of injected waste material but this zone may also lie in close proximity below a known aquifier with no or only a relatively thin, relatively impermeable layer or strata therebetween. Further, this zone may also contain a fault or the like which could provide a channel through which waste material might escape from the disposal zone should the fracture extend into and communicate with the fault.

In such formations, it is vital to continuously monitor the fracture as it is being formed to insure that the fracture does not extend beyond the proposed disposal zone through the overburden or into a fault whereby the injected waste material might flow through the extended fracture into and contaminate the aquifier. In fact, it is reasonable to assume that such monitoring will be required by governmental agencies in the near future when subterranean formations are routinely used as waste disposal zones.

Until recently, the monitoring of the location and the size of a hydraulic fracture(s) (i.e. fracture length, height, width, and rate of growth) at any specific time during a fracturing operation had to be predicted from calculations using complex mathematical models which, in turn, were complied from a set of predetermined, pre-fracture characteristics of the formation to be fractured. Due to practical considerations (e.g. most subterranean formations are inhomogeneous) and the accuracy of the data used, the real-time location of a fracture may vary substantially from the position predicted by a particular model.

Recently, several techniques have been proposed for the real-time monitoring of a fracture as it is being formed in a formation. For example, in an article entitled "Active and Passive Imaging of Hydraulic Fractures", by P. B. Willis, GEOPHYSICS: The Leading Edge of Exploration, July, 1992, there is a system described for monitoring the growth of hydraulic fractures wherein the seismic events created within the formation during the fracturing operation are detected and measured by geophones positioned within one or more instrumented monitor wells. These measured signals are later processed and analyzed to produce the fracture profile within the formation.

In another article entitled "The Application of High Frequency Seismic Monitoring Methods for the Mapping of Grout Injections" by E. L. Majer, THE INTERNATIONAL JOURNAL OF ROCK MECHANICS, MINING SCIENCE AND GEOMECHANICS, Vol. 26, Nos. 3 and 4, pps. 249–256, 1989, a real-time monitoring system is disclosed wherein digital data at sample rates greater than 50,000 samples per second were used to capture the data necessary in a meaningful analysis of a laboratory-scale fracture monitoring operation. This system is proposed for use in determining the real-time extent and location of hydraulic fractures, particularly, but not limited to, those fractures formed by the injection of fluids through an injection well during waste disposal.

Still another system proposed for monitoring the location and extent of a fracture as it is being formed is disclosed and claimed by the present inventor's co-pending, commonly-assigned U.S. patent application Ser. No. 08/196,621, filed Feb. 14, 1994 wherein a plurality of acoustical sensors are positioned within a well and are adapted to receive distinct, acoustical signals which are generated by a series of individual "micro-earthquakes" which, in turn, sequentially occur in a formation as a hydraulic fracture grows or propagates outward from and vertically along the wellbore of the injection well.

These sensors, e.g. geophones, may be positioned through the injection tubing of an injection well and/or within separate, spaced monitor wells as disclosed in U.S. patent application Ser. No. 08/196,621 or they may be placed in the well annulus of the injection well as disclosed in the present inventor's co-pending and commonly assigned U.S. patent application Ser. No. 08/426,306, filed Apr. 21, 1995, now U.S. Pat. No. 5,503,225..

In these real-time, fracture-monitoring operations, it is critical that a good acoustical transmission path be established between the sensors and the wellbore in which they are positioned so that acoustic energy generated in the the disposal zone during fracturing can be detected by the sensors. To do this, the sensors must be acoustically coupled to the formation. For example, sensors (e.g. hydrophones) may be isolated in the well annulus which is filled with water or the like to thereby acoustically couple the sensors to the casing, hence the formations behind the casing. Another way to acoustically-couple the sensors (e.g. geophones) to the disposal zone is to attach the geophones to a tubing and lower the tubing into the well casing whereupon the weight of the tubing causes it to bow into contact with the casing; thereby placing the geophones into physical contact with the casing and hence the formations behind the casing.

Still further, the sensors may be lowered into a wellbore and acoustically coupled thereto by flowing a permanent cement down the wellbore and around the sensors. Once the cement is set, the sensors are physically and acoustically coupled to the casing, hence the disposal zone behind the casing. However, while permanently cementing the sensors in place provides a good acostical coupling between the formations behind the well casing and the sensors, the well in which the sensors are cemented is effectively lost and is usually abandoned. As will be recognized, this can prove expensive and may be unacceptable where the well might otherwise still have utility in a producing field once the disposal operation has been terminated.

SUMMARY OF THE INVENTION

The present invention provides a method for releasably, coupling an acoustical-energy sensor in a wellbore wherein the the sensor is lowered in the wellbore and a soluble cement is flowed down the wellbore to completely encompass the sensor. The soluble cement is allowed to harden to physically bond and thereby acoustically couple the sensor to said wellbore. This provides a good acoustical path through which the acoustic energy which is generated during a fracturing operation can reach the sensors. Upon termination of the fracturing operation, a solvent is flowed down the wellbore and into contact with the hardened soluble cement to dissolve the soluble cement. The dissolved cement can then be circulated out of the well and the sensors can be removed so that the well can again be used for other purposes.

More specifically, a plurality of acoustic-energy sensors (e.g. geophones, hydrophones, accelerometers, etc.) are removably coupled in a wellbore of a well which is to be used to monitor a fracture in a formation such as in a zone which is to be used for the disposal of waste materials (e.g. oily solutions, drill cuttings, etc.). The well may be an injection well or it may be a dedicated monitor well. The particular well is drilled and completed through a subterranean formation which includes the disposal zone.

If the well is an injection well, a plurality of acoustic-energy sensors may be lowered on a transmission cable through the string of injection tubing to a point below the injection zone of the well or the sensors may be isolated in the annulus which is formed between the tubing and the wellbore. If a monitor well, the sensors may be supported on and lowered with a string of tubing so that the sensors will be spaced from a point below to a point above the expected vertical boundaries of the fracture to be formed within the disposal zone.

In accordance with the present invention, the sensors are acoustically-coupled within their respective wellbores by flowing a soluble cement down around the sensors and allowing the cement to harden to provide a solid, physical connection between the sensors and the wellbore but one which can readily be broken when desired. The soluble cement used in the present invention is preferably selected from the acid-soluble cements of the type used in the recovery of lost circulation in the well drilling art. This type cement is readily soluble in acid solutions.

Upon termination of the disposal operation, a solvent (e.g. 15% HCl) is flowed down the well and into contact with the soluble cement to dissolve it and thereby break the physical bond between the sensors and the wellbore. The cement can then be circulated out of the well and the sensors can be retrieved from the well. The well can then be used for other purposes such as serving as a production and/or injection in further recovery operations.

BRIEF DESCRIPTION OF THE DRAWINGS

The actual construction, operation, and apparent advantages of the present invention will be better understood by referring to the drawings which are not necessarily to scale and in which like numerals identify like parts and in which.

BEST KNOWN MODE FOR CARRYING OUT THE INVENTION

Figure 1:
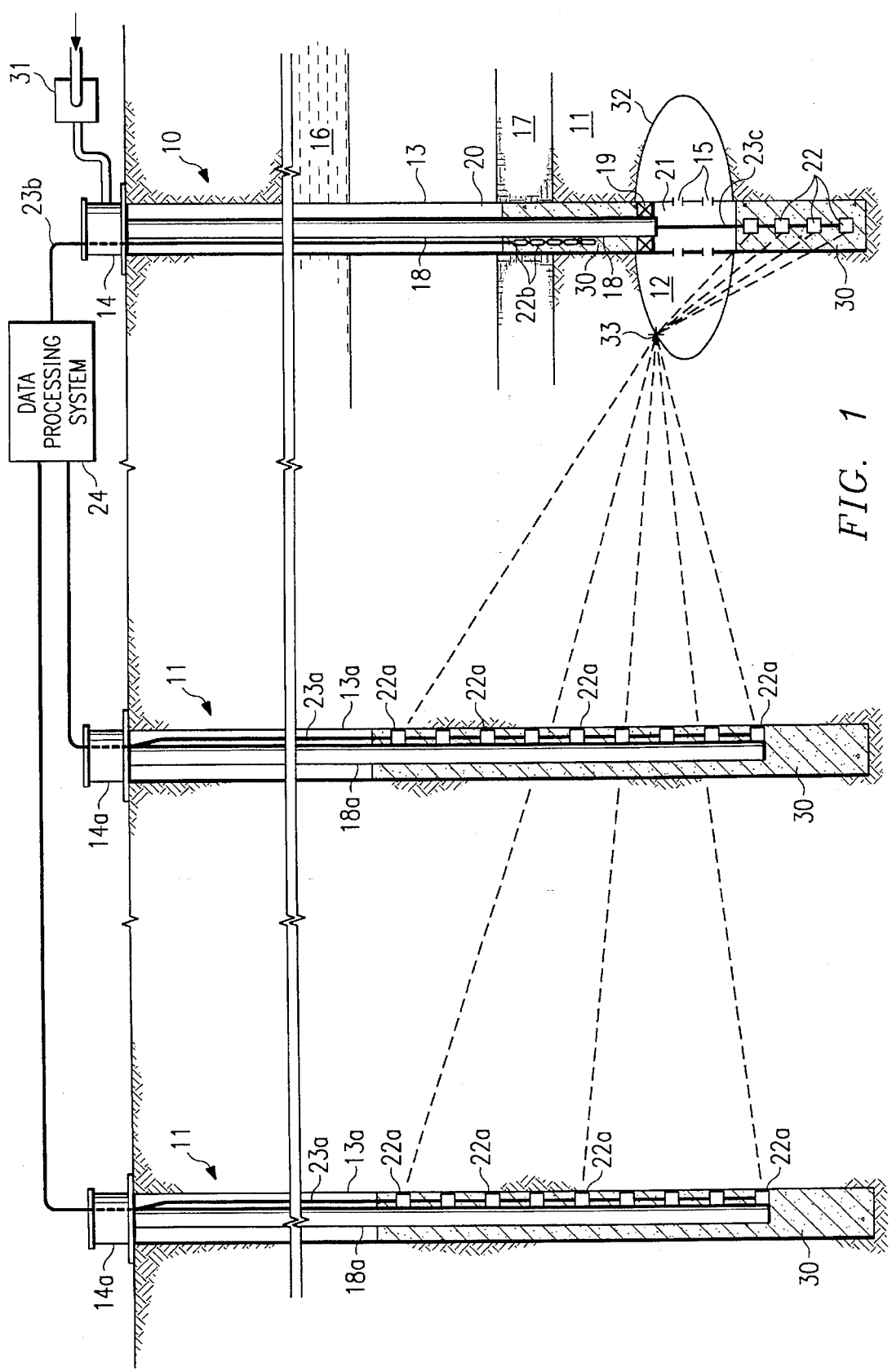
FIG. 1 is an elevational view, partly in section, illustrating an injection well for disposing of waste material into a subterranean formation wherein a one set of acoustic sensors have been acoustically-coupled within the well annulus through the use an acid-soluble cement and another set of acoustic sensors have been acoustically-coupled within the well casing below the perforations through the use of acid-soluble cement in accordance with the present invention.

Referring more particularly to the drawings, FIG. 1 discloses a waste disposal system which is comprised of an injection well 10 and a plurality (two shown) of spaced, monitor wells 11. The injection well 10 has been drilled and completed through a subterranean formation 12 (hereinafter "disposal zone") which, in turn, is to be used in disposing of waste materials (e.g. oily solutions, drill cuttings, etc.). As shown, the injection well 10 and each of the monitor wells 11 are cased with well casing 13, 13a, respectively, which extends from conventional wellheads 14, 14a, respectively, at the surface through the formation(s) in which the disposal zone 12 lies. Casing 13 in injection well 10 includes perforations 15 which lie adjacent to disposal zone 12. Of course, casing 15 may terminate above zone 11 with zone 12 then being completed "open hole", as will be understood by those skilled in the art.

Ideally, disposal zone 12 lies in a formation which is capable of being hydraulically fractured and is one which is separated from overlying aquifers 16 or the like by a layer of a relatively impermeable formation 17 (e.g. shale). That is, formation 17 has a greater in situ stress than does zone 12 which aids in preventing any hydraulically-induced fractures in zone 12 from extending upward and breaking into and through formation 17 and/or aquifer 16.

A string of tubing 18 is lowered into the wellbore of injection well 10 and terminates near or at perforations 15 in casing 12. A first set or plurality of acoustic-energy sensors 22b are mounted onto tubing 18 and are lowered therewith into the wellbore. Tubing 18 carries a packer 19 which isolates the injection zone 21 from the well annulus 20 which, in turn, is formed between casing 12 and tubing 18 above packer 19. A second set or plurality of acoustic-energy sensors 22 are connected into a transmission cable 23 or the like and are lowered thereon through tubing 18 into the wellbore to a point below perforations 15. Typically, the sensors will be spaced at relatively short intervals (15 feet) and will extend for a substantial distance above or below perforations 15, respectively.

Figure 2:
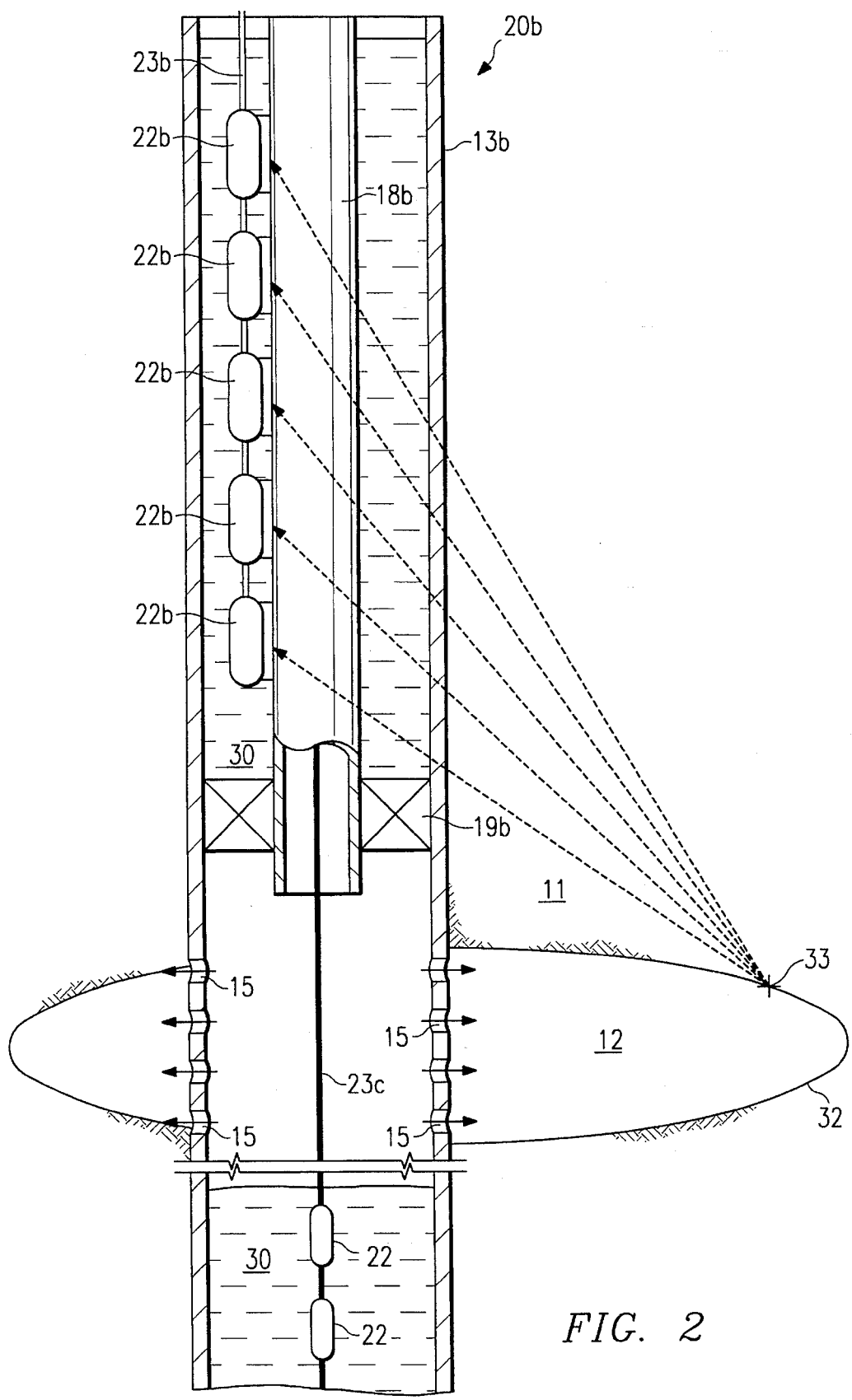
FIG. 2 is an enlarged view of the lower end of the injection well of FIG. 1.

In the monitor wells 11, a plurality of sensors 22a are connected into transmission cable 23a and are shown as being attached to and lowered with a string of support tubing 18a. A large number of these sensors (40–50 geophones) will be spaced at relatively short intervals (15 feet) and are positioned so that some of the sensors will lie above, through, and below the expected vertical boundaries of the hydraulic fracture which is to be formed in zone 12. FIG. 2 discloses clearly the placement of the sensors in an injection well 10b wherein the acoustic sensors 22b are connected into transmission cable 23b and are positioned within the well annulus 20b which, in turn, is formed between injection tubing 18b and casing 12b and is isolated from the injection zone 21b by packer 19b while sensors 22 are suspended from transmission cable 23c within the casing to a point below the perforations 15.

The sensors 22, 22a, 22b, themselves, may be selected from any appropriate acoustic-energy sensing devices (e.g. geophones, accelerometers, tiltmeters, etc.) which generate a signal in response to received acoustical energy and then transmit the generated signal on for recording or further processing. For example, a typical sensor 22 may be a geophone unit (not shown) which, in turn, is comprised of three orthogonally-arranged detectors (e.g. 30 Hz broad band type detector wherein the detectors are oriented to provide one vertical and two horizontal energy-sensing and signal-transmitting channels such as is commercially-available as a type "SM-11" from SENSOR, Houston, Tex.).

In accordance with the present invention, the sensors 22, 22a, 22b are positioned within injection well 10 (FIG. 1), monitor wells 11, and/or injection well 10b (FIG. 2), respectively, and are all acoustically-coupled within their respective wells by a "soluble" cement 30. As used herein, "soluble cement" is intended to refer to any material which is capable of being pumped into the well and which, upon standing, will set and harden to form a solid material which physically bonds and acoustically-couples the sensors to the wellbore but then is readily dissolvable when contacted with a solvent.

For example, the soluble cement used in the present invention is preferably selected from acid-soluble cements of the type used in the recovery of lost circulation in the well drilling art which has similar characteristics of conventional cements in strength and pumpability but is very different chemically. One such cement is comprised of a stoichiometric mixture of magnesium and calcium oxides, carbonates and sulfates which when mixed with water, polymerizes to form a polyhydrate which is dissolvable by an acid; e.g. "MAGNE PLUS CEMENT", commercially available from BJ Services Company, USA, Tomball, Tex. This soluble cement is 100% soluble in 15% hydrochloric acid (HCl) at all temperatures although some additives therein may have traces of insolubles which may reduce the overall solubility by up to 2%.

In operation, the sensors are lowered into position within their respective wellbores or well annulus, as the case may be, and a sufficient volume of soluble cement 30 is flowed down the well to completely encompass all of the sensors in a particular well. The soluble cement is allowed to harden into a solid material which physically bonds and acoustically couples the sensors to casing 13 and hence to the formation(s) behind the casing.

The sensors 22, 22a, 22b (be they geophones, accelerometers, tiltmeters, etc.) will generate signals in response to the acoustical energy caused by the fracturing of zone 12 and will transmit these signals through respective channels in their respective transmission cables 23 to data receiving and processing system 24 on the surface. As pump 31 (FIG. 1) pumps a waste material (e.g. slurry of drill cuttings or the like) down through tubing 18 in the injection well 10 and out through perforations 13 into disposal zone 11, the waste act as a fracturing fluid which will initiate and extent a fracture 32 within zone 12 as the waste material is deposited therein.

As is known, there is significant seismic activity associated with a typical hydraulic fracturing operation such as that involved in waste disposal. This activity results from the way it is believed that a fracture "grows" (i.e. is extended into a formation). That is, fluid is pumped and builds up into the fracture until the in situ stress is overcomed at which time, the formation further "fractures" to thereby extend the fracture a further distance (i.e. vertically and/or horizontally ) into the formation.

This results in a series of relatively small, sequential extensions or "jumps" (i.e. shocks), each of which causes a "micro-earthquake". As these discrete, localized micro-earthquakes occur during the growth of the fracture (both laterally and vertically), the amplitude of the seismic or acoustical energy (i.e. compressional or "P" waves and/or shear or "S" waves) generated by each occurrence will typically be significant enough to be detected at locations (i.e. sensors 22, 22a, 22b) which are remote from the origination point (e.g. 33 in FIGS. 1 and 2).

Accordingly, by sensing and recording the P and S waves in conjunction with their respective arrival times at at various depths (i.e. at each of the spaced sensors 22), these respective acoustical signals can be processed in accordance with known seismic and/or earthquake monitoring methodology to determine the position of the micro-earthquakes 33; hence, the geometry of the fracture 31 and its location. For a more complete description of one method for processing the signals from sensors 22 for the real-time determination of the location of fracture 31, see the above-mentioned U.S. patent application Ser. No. 08/196,621 filed by the present inventor.

It can be seen that by monitoring the progression of fracture 31 through sensors 22 as it is being formed in disposal zone 12, any advance of the fracture towards or into the overburden (i.e. impermeable strata 17 or an aquifier or the like) is promptly detected and if such advance threatens to exceed the desired boundaries of disposal zone 12, the injection of waste material can be stopped without any substantial encroachment of waste material into the overlying strata.

Upon termination of the fracturing operation, a solvent (e.g. 15% HCl) is flowed down into the well and into contact with soluble cement 30 to dissolve same so that it can then be circulated out of the well. This, in turn, breaks the physical bond between the sensors and the casing thereby freeing the sensors for retrieval to the surface and leaving the respective well again free to be used from other purposes, e.g. as a production or an injection well.

What is claimed is:

1. A method for acoustically-coupling an acoustical-energy sensor in a wellbore, said method comprising:

lowering an acoustical-energy sensor in said wellbore;

flowing an acid-soluble cement into the wellbore to fill said wellbore around said acoustical-energy sensor, said acid-soluble cement comprising a stoichiometric mixture of magnesium and calcium oxides, carbonates, and sulfates which when mixed with water, polymerizes to form a polyhydrate; and allowing said acid-soluble cement to harden to thereby acoustically couple said acoustical-energy sensor to said wellbore.

2. The method of claim 1 wherein said acoustical sensor comprises:

a geophone.

3. A method for releasably, acoustically-coupling an acoustical-energy sensor in a wellbore, said method comprising:

lowering an acoustical-energy sensor in said wellbore;

flowing a soluble cement into the wellbore to encompass said acoustical-energy sensor;

allowing said soluble cement to harden to thereby acoustically couple said acoustical-energy sensor to said wellbore during a acoustical sensing operation; and flowing a solvent into the wellbore and into contact with said hardened soluble cement to dissolve said soluble cement to thereby uncouple said sensor from said wellbore and free said sensor for retrieval from the wellbore.

4. The method of claim 3 wherein said soluble cement comprises:

an acid-soluble cement.

5. The method of claim 4 wherein said acid-soluble cement comprises:

a stoichiometric mixture of magnesium and calcium oxides, carbonates and sulfates which when mixed with water, polymerizes to form a polyhydrate.

6. The method of claim 5 wherein said acoustical sensor comprises:

a geophone.

7. The method of claim 4 wherein said solvent comprises:

an acid solution.

8. The method of claim 7 wherein said acid solution comprises:

15% hydrochloric acid.

* * * * *